(12) United States Patent
Wu et al.

(10) Patent No.: US 10,708,899 B2
(45) Date of Patent: Jul. 7, 2020

(54) DEVICE AND METHOD FOR HANDLING A CODE BLOCK GROUP-BASED TRANSMISSION

(71) Applicant: HTC Corporation, Taoyuan (TW)

(72) Inventors: Chih-Hsiang Wu, Taoyuan (TW); Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/976,887

(22) Filed: May 11, 2018

(65) Prior Publication Data

US 2018/0332568 A1 Nov. 15, 2018

Related U.S. Application Data

(60) Provisional application No. 62/505,133, filed on May 12, 2017.

(51) Int. Cl.
*H04W 72/04* (2009.01)
*H04L 1/18* (2006.01)
*H04L 5/00* (2006.01)
*H04W 72/12* (2009.01)
*H04B 7/0413* (2017.01)
*H04W 76/27* (2018.01)
(Continued)

(52) U.S. Cl.
CPC ........ *H04W 72/042* (2013.01); *H04B 7/0413* (2013.01); *H04B 7/0697* (2013.01); *H04L 1/1621* (2013.01); *H04L 1/1812* (2013.01); *H04L 1/1896* (2013.01); *H04L 5/0055* (2013.01); *H04W 72/12* (2013.01); *H04W 76/27* (2018.02)

(58) Field of Classification Search
CPC .................................................. H04W 72/042
See application file for complete search history.

(56) References Cited

U.S. PATENT DOCUMENTS

| | | | |
|---|---|---|---|
| 2018/0054800 A1* | 2/2018 | Yeo | H04L 5/0042 |
| 2018/0269898 A1* | 9/2018 | Sun | H04L 1/0083 |
| 2018/0278379 A1* | 9/2018 | Sun | H04L 1/08 |

(Continued)

OTHER PUBLICATIONS

3GPP TSG RAN WG1 Meeting #87, R1-1612137, Nov. 14-18, 2016.

(Continued)

*Primary Examiner* — Jason E Mattis
(74) *Attorney, Agent, or Firm* — Winston Hsu

(57) ABSTRACT

A network for handling a CBG-based transmission comprises a storage device for storing instructions and a processing circuit coupled to the storage device. The storage device stores, and the processing circuit is configured to execute instructions of configuring a CBG-based transmission to a communication device; generating a plurality of CBG sets; generating a plurality of cumulative indices for the plurality of CBG sets, respectively, and generating a total index for the plurality of CBG sets; generating a plurality of downlink control informations (DCIs), wherein each of the plurality of DCIs comprises information indicating a size of a corresponding one of the plurality of CBG sets, a corresponding one of the plurality of cumulative indices and the total index; and transmitting the plurality of DCIs and the plurality of CBG sets to the communication device via the CBG-based transmission.

19 Claims, 4 Drawing Sheets

(51) Int. Cl.
*H04B 7/06* (2006.01)
*H04L 1/16* (2006.01)

(56) References Cited

U.S. PATENT DOCUMENTS

| | | | |
|---|---|---|---|
| 2018/0278399 A1* | 9/2018 | Sundararajan | H04L 1/1635 |
| 2018/0302128 A1* | 10/2018 | Akkarakaran | H04L 1/1864 |
| 2018/0302191 A1* | 10/2018 | Park | H04L 1/1614 |
| 2018/0323920 A1* | 11/2018 | Zhu | H04L 5/0016 |
| 2019/0020445 A1* | 1/2019 | Kim | H04L 1/18 |

OTHER PUBLICATIONS

3GPP TSG RAN1#88, Feb. 13-17, 2017.
3GPP TSG RAN WG1 Meeting #88 R1-1702990, Feb. 13-17, 2017.
3GPP TS 36.212 V14.1.0, Dec. 2016.
3GPP TS 36.213 V14.1.0, Dec. 2016.

* cited by examiner

DEVICE AND METHOD FOR HANDLING A CODE BLOCK GROUP-BASED TRANSMISSION

CROSS REFERENCE TO RELATED APPLICATIONS

This application claims the benefit of U.S. Provisional Application No. 62/505,133, filed on May 12, 2017, which is incorporated herein by reference.

BACKGROUND OF THE INVENTION

1. Field of the Invention

The present invention relates to a device and a method used in a wireless communication system, and more particularly, to a device and a method of handling a code block group (CBG)-based transmission.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control. A fifth generation (5G) (or called new radio (NR)) system provides a higher data rate and a lower latency for data transmission than those of a long-term evolution (LTE) system.

SUMMARY OF THE INVENTION

The present invention therefore provides a communication device and method for handling Hybrid a code block group (CBG)-based transmission to solve the abovementioned problem.

A network for handling a CBG-based transmission comprises a storage device for storing instructions and a processing circuit coupled to the storage device. The storage device stores, and the processing circuit is configured to execute instructions of configuring a CBG-based transmission to a communication device; generating a plurality of CBG sets; generating a plurality of cumulative indices for the plurality of CBG sets, respectively, and generating a total index for the plurality of CBG sets; generating a plurality of downlink control informations (DCIs), wherein the plurality of DCIs comprise the plurality of CBG sets, a plurality of sizes of the plurality of CBG sets and the plurality of cumulative indices, respectively, and comprise the total index; and transmitting the plurality of DCIs and the plurality of CBG sets to the communication device via the CBG-based transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
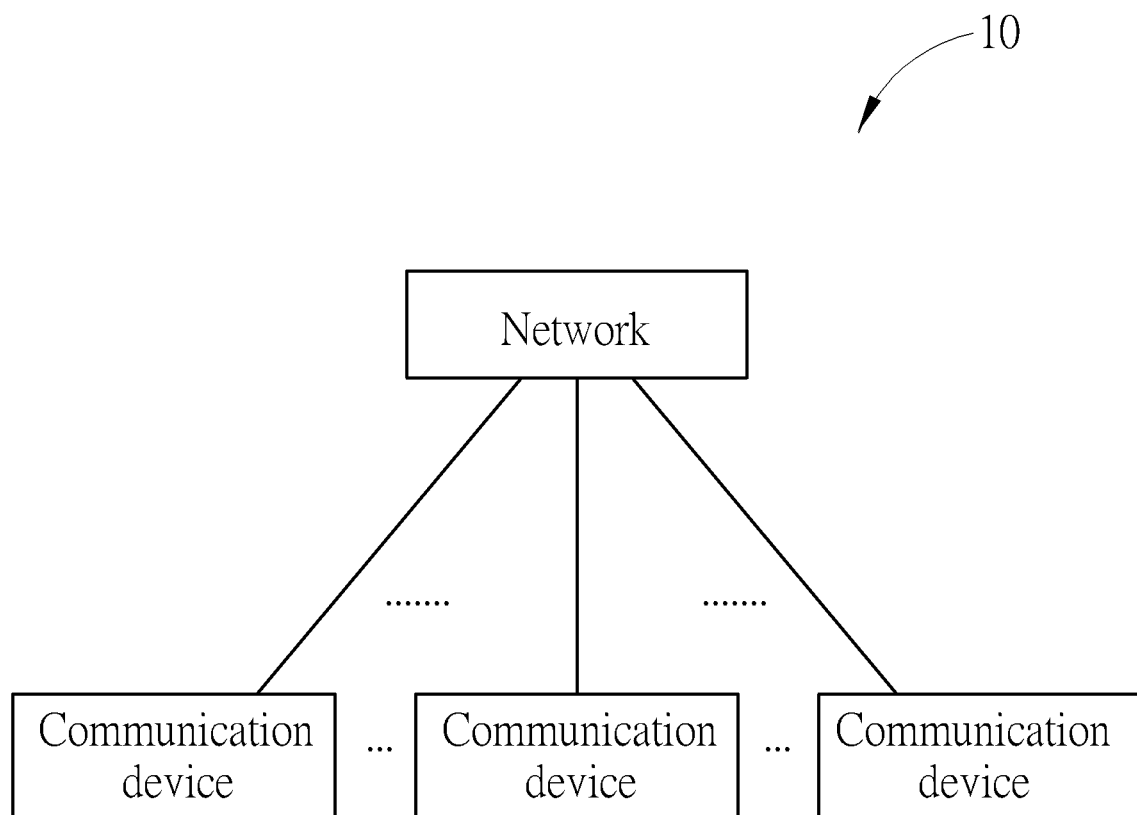
FIG. 1 is a schematic diagram of a wireless communication system according to an example of the present invention.

In FIG. 1, the wireless communication system 10 is briefly composed of a network and a plurality of communication devices. The network and a communication device may communicate with each other via one or more carriers of licensed band (s) and/or unlicensed band (s). The network and the communication device may communicate with each other via one or multiple cells (e.g., one or multiple carriers) belonging to one or multiple base stations (BSs). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network includes an evolved universal terrestrial radio access network (E-UTRAN) including at least one evolved Node-B (eNB) and a fifth generation (5G) network including at least one 5G BS (e.g., gNB) which employs orthogonal frequency-division multiplexing (OFDM) and/or non-OFDM and a transmission time interval (TTI) shorter than 1 ms (e.g., 1, 2, 3 or 4 OFDM symbols, 100 or 200 microseconds), to communicate with the communication devices.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
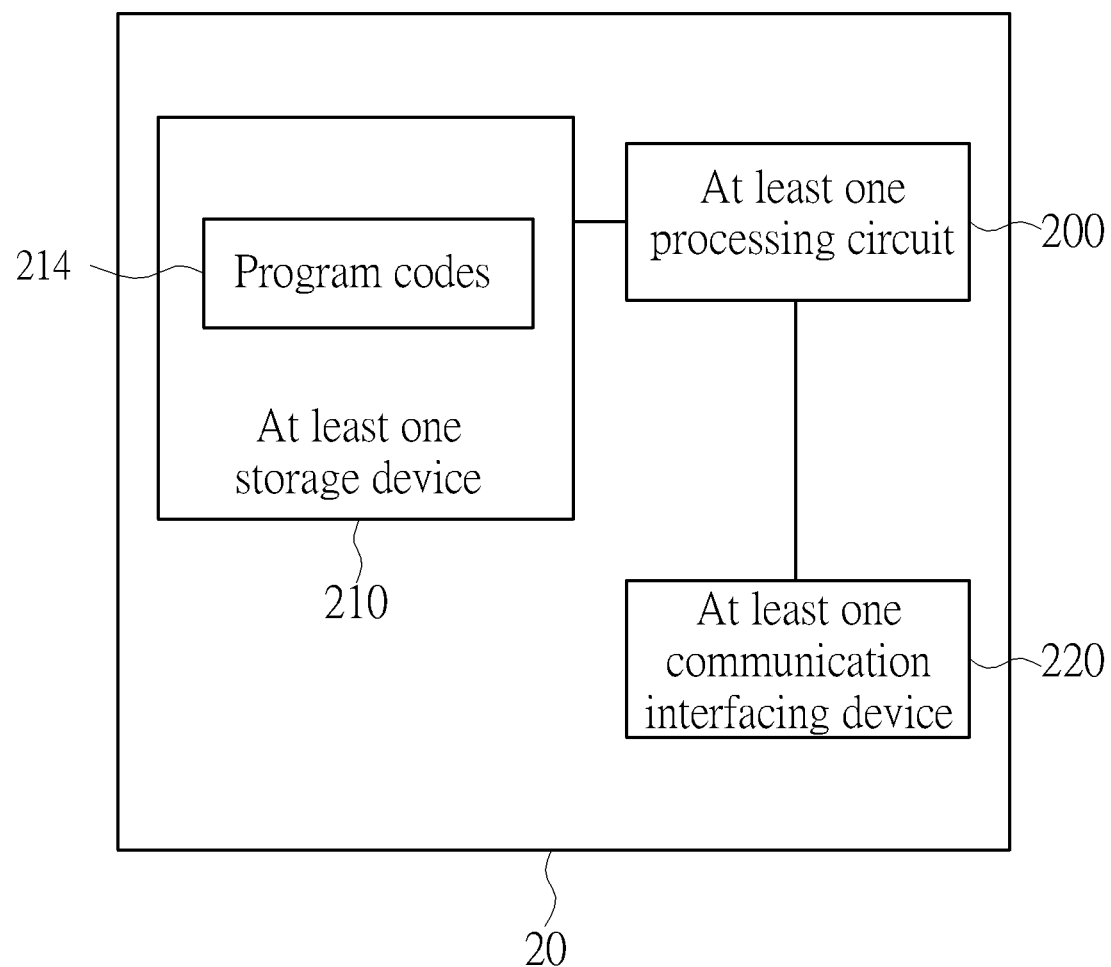
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
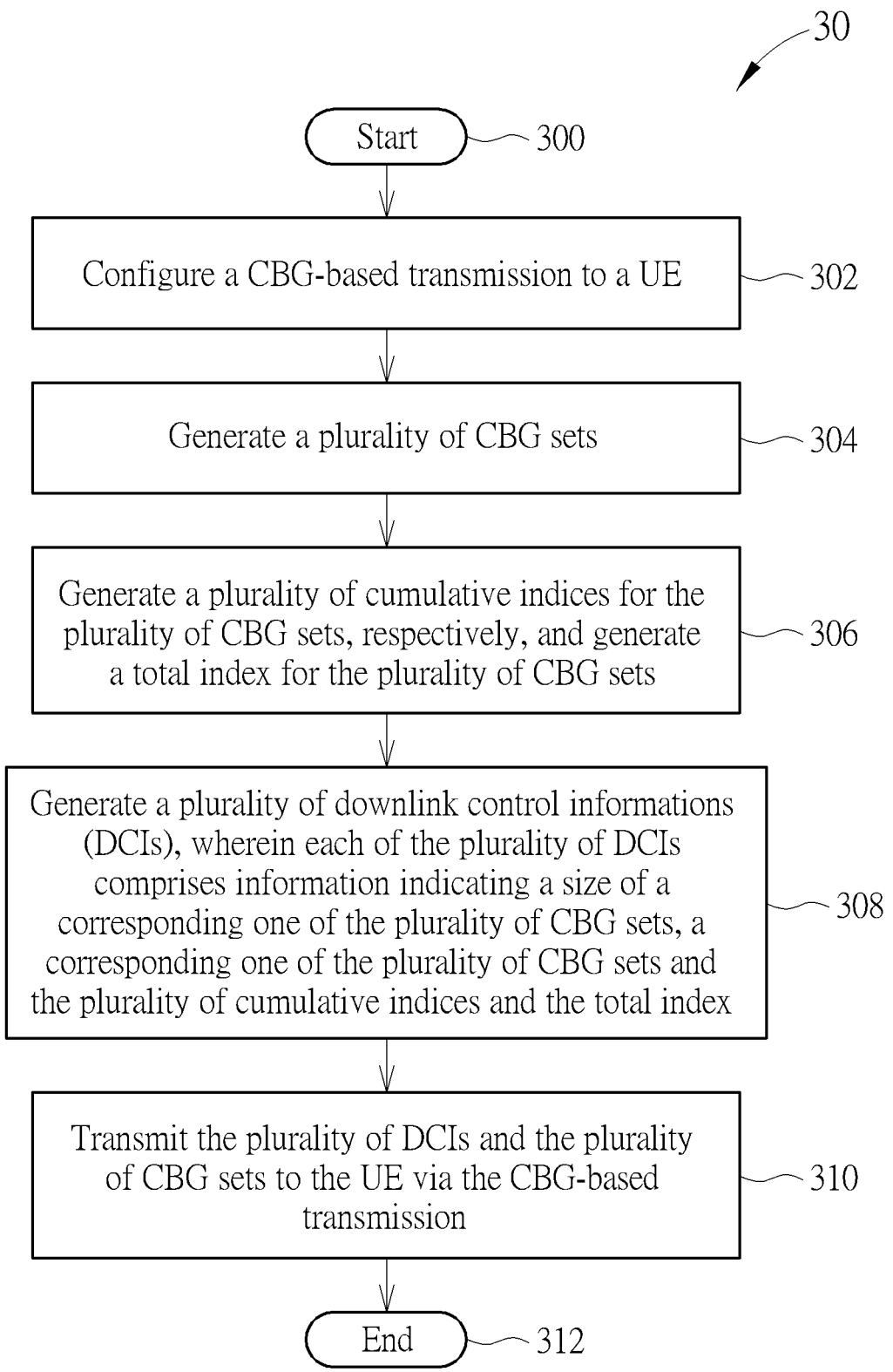
FIG. 3 is a flowchart of a process according to an example of the present invention.

A process 30 in FIG. 3 is utilized in a network shown in FIG. 1, and includes the following steps:
Step 300: Start.
Step 302: Configure a CBG-based transmission to a UE.
Step 304: Generate a plurality of CBG sets.
Step 306: Generate a plurality of cumulative indices for the plurality of CBG sets, respectively, and generate a total index for the plurality of CBG sets.
Step 308: Generate a plurality of downlink control informations (DCIs), wherein each of the plurality of DCIS comprises information indicating a size of a corresponding one of the plurality of CBG sets, a corresponding one of the plurality of CBG sets and the plurality of cumulative indices and the total index.
Step 310: Transmit the plurality of DCIS and the plurality of CBG sets to the UE via the CBG-based transmission.
Step 312: End.

According to the process 30, the network configures a CBG-based transmission to a UE. The network generates a plurality of CBG sets. The network generates a plurality of cumulative indices for the plurality of CBG sets, respectively, and generates a total index for the plurality of CBG sets. The network generates a plurality of DCIS, wherein each of the plurality of DCIs comprises information indicating a size of a corresponding one of the plurality of CBG sets, a corresponding one of the plurality of cumulative indices and the total index. The plurality of CBG sets correspond to the plurality of DCIs, respectively. The plurality of cumulative indices correspond to the plurality of DCIs, respectively. Then, the network transmits the plurality of DCIs and the plurality of CBG sets to the UE via the CBG-based transmission. That is, the network transmits the DCIs including the plurality of sizes, the plurality of cumulative indices and the total index to the UE. The UE may generate correct Hybrid Automatic Repeat Request (HARQ) feedback messages according to the DCIs. Thus, the UE and the network may communicate with each other regularly.

Realization of the process 30 is not limited to the above description. The following examples may be applied to the process 30.

In one example, the network configures the CBG-based transmission to the UE by transmitting a radio resource control (RRC) message including a configuration configuring the CBG-based transmission to the UE. In one example, a CBG set of the plurality of CBG sets is a plurality of CBGs including at least one transport block (TB). In one example, each CBG includes at least one CB. In one example, a difference between two adjacent cumulative indices of the plurality of cumulative indices is determined according to the size of the corresponding one of the plurality of CBG sets. One of the two adjacent cumulative which indicates a larger value and the size of the corresponding one of the plurality of CBG sets are transmitted in a same DCI of the plurality of DCIs. In one example, the size of the corresponding one of the plurality of CBG sets corresponds to a number of CBGs in the corresponding one of the plurality of CBG sets. In one example, the plurality of cumulative indices are a plurality of counter DL assignment indices (DAIs), and the total index is a total DAI.

In one example, the network transmits at least one RRC message comprising at least one configuration configuring a plurality of component carriers (CCs) to the UE. In one example, the network transmits the plurality of DCIs and the plurality of CBG sets to the UE via the CBG-based transmission on the plurality of CCs, respectively. In one example, at least one DCI of the plurality of DCIs and at least one CBG set of the plurality of CBG sets are not transmitted on at least one same CC according to a cross-carrier scheduling (CCS). For example, if the CCS is enabled, the network transmits a CBG set on a CC and transmits a DCI for the CC on another CC. For example, if the CCS is not enabled, the network transmits a CBG set and a DCI for a CC on the CC.

In one example, the network transmits the plurality of DCIs and the plurality of CBG sets to the UE via the CBG-based transmission on one of the plurality of CCs according to a multi-input multi-output (MIMO) scheme. In one example, the MIMO scheme is a spatial multiplexing (SM) scheme. In one example, the network transmits the plurality of DCIs and the plurality of CBG sets to the UE via the CBG-based transmission on one of the plurality of CCs in a plurality of TTIs (e.g., slots or subframes), respectively. That is, the network communicates with the UE according to a TDD mode.

In one example, the network receives at least one negative acknowledgement (NACK) in at least one HARQ feedback message from the UE. Then, the network retransmits at least one CBG in the plurality of CBG sets in response to the at least one NACK.

For example, the network configures 10 CCs CC1-CC10 to the UE. The network generates 4 CBGs for the CC2, 10 CBGs for the CC4, 2 CBGs for the CC5 and zero CBG for the other CCs. That is, a first size of the CBGs transmitted on the CC2 is 4, a second size of the CBGs transmitted on the CC4 is 10, and a third size of the CBGs transmitted on the CC5 is 2. Then, the network numbers the 4 CBGs transmitted on the CC2 as "1", "2", "3" and "4", the 10 CBGs transmitted on the CC4 as "5", "6", "7", "8", "9", "10", "11", "12", "13" and "14", and the 2 CBGs transmitted on the CC5 as "15" and "16". The network generates a first cumulative index "4" indicating that 4 CBGs are transmitted on the CC2, a second cumulative index "14" indicating that 14 CBGs are transmitted on the CC2 and the CC4, and a third cumulative index "16" indicating that 16 CBGs are transmitted on the CC2, the CC4 and the CC5. The network generates a total index "16" indicating that 16 CBGs are transmitted on the CCs. Then, the network transmits the 4 CBGs for the CC2 and a first DCI including the first size, the first cumulative index "4" and the total index "16" on the CC2, transmits the 10 CBGs for the CC4 and a second DCI including the second size, the second cumulative index "14" and the total index "16" on the CC4, and transmits the 2 CBGs for the CC5 and a third DCI including the third size, the third cumulative index "16" and the total index "16" on the CC5. In one example, the CBGs may be numbered from "0" instead of "1".

Figure 4:
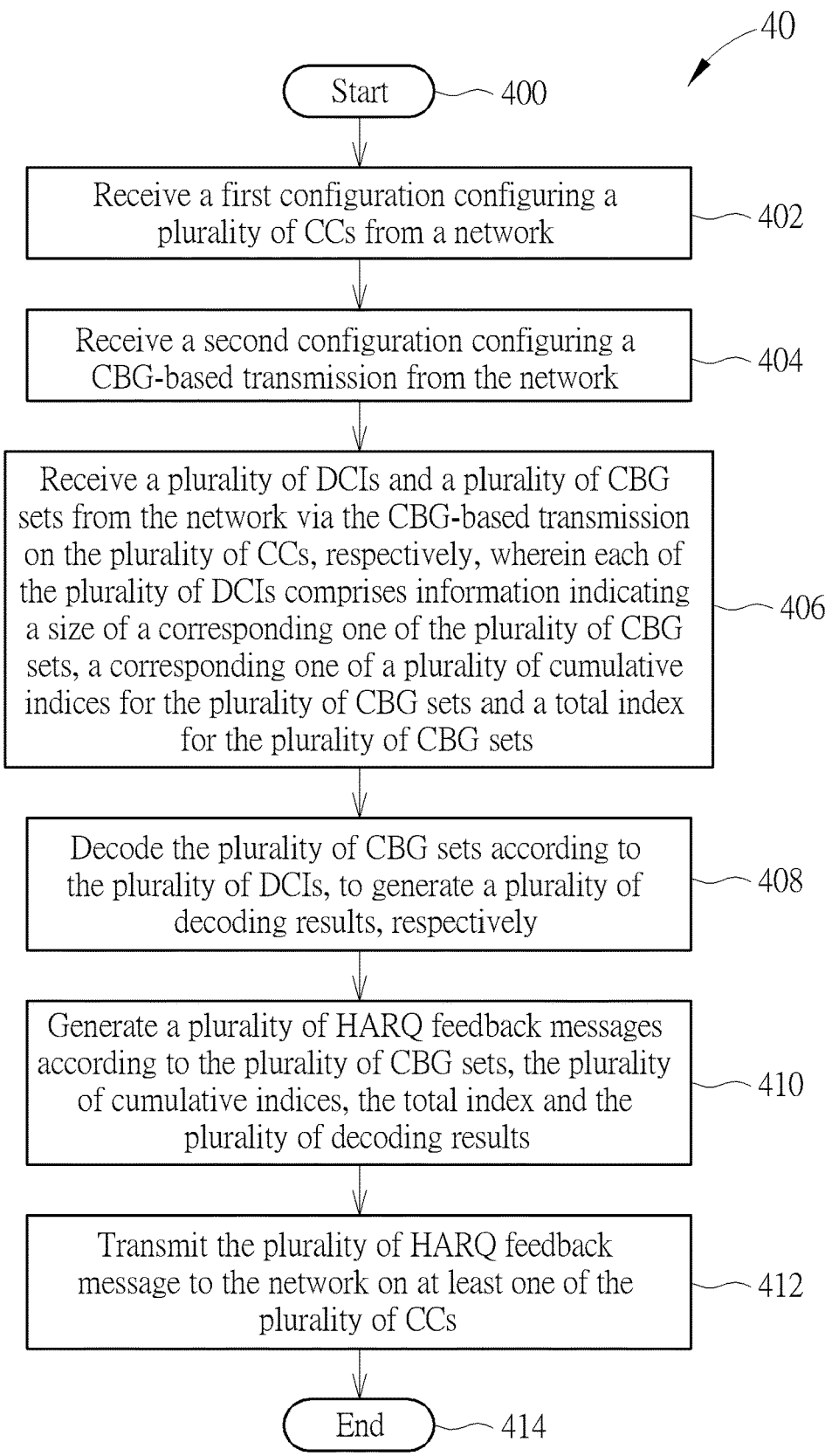
FIG. 4 is a flowchart of a process according to an example of the present invention.

A process 40 in FIG. 4 is utilized in a UE shown in FIG. 1, and includes the following steps:
Step 400: Start.
Step 402: Receive a first configuration configuring a plurality of CCs from a network.
Step 404: Receive a second configuration configuring a CBG-based transmission from the network.
Step 406: Receive a plurality of DCIs and a plurality of CBG sets from the network via the CBG-based transmission on the plurality of CCs, respectively, wherein each of the plurality of DCIs comprises information indicating a size of a corresponding one of the plurality of CBG sets, a corresponding one of a plurality of cumulative indices for the plurality of CBG sets and a total index for the plurality of CBG sets.
Step 408: Decode the plurality of CBG sets according to the plurality of DCIs, to generate a plurality of decoding results, respectively.

Step 410: Generate a plurality of HARQ feedback messages according to the plurality of CBG sets, the plurality of cumulative indices, the total index and the plurality of decoding results.

Step 412: Transmit the plurality of HARQ feedback message to the network on at least one of the plurality of CCs.

Step 414: End.

According to the process 40, the UE receives a first configuration configuring a plurality of CCs from a network, and receives a second configuration configuring a CBG-based transmission from the network. The UE receives a plurality of DCIS from the network via the CBG-based transmission on the plurality of CCs, respectively, wherein each of the plurality of DCIs comprises information indicating a size of a corresponding one of the plurality of CBG sets, a corresponding one of a plurality of cumulative indices for the plurality of CBG sets and a total index for the plurality of CBG sets. The plurality of CBG sets correspond to the plurality of DCIS, respectively. The plurality of cumulative indices correspond to the plurality of DCIS, respectively. The UE decodes the plurality of CBG sets according to the plurality of DCIS, to generate a plurality of decoding results, respectively. Then, the UE transmits the plurality of HARQ feedback message to the network via the CBG-based transmission on at least one of the plurality of CCs. In one example, the UE may combine (e.g., concatenate) the plurality of HARQ feedback messages to a HARQ feedback message, and may transmits the HARQ feedback message to the network via the CBG-based transmission on at least one of the plurality of CCs. That is, the UE knows whether the sizes of the received CBG sets are correct according to the plurality of sizes, the plurality of cumulative indices and the total index. The UE may generate correct HARQ feedback messages according to the DCIS. Thus, the UE and the network may communicate with each other regularly.

Realization of the process 40 is not limited to the above description. The following examples may be applied to the process 40.

In one example, a CBG set of the plurality of CBG sets is a plurality of CBGs including at least one transport block (TB). In one example, each CBG includes at least one CB. In one example, a difference between two adjacent cumulative indices of the plurality of cumulative indices is determined according to the size of the corresponding one of the plurality of CBG sets. One of the two adjacent cumulative which indicates a larger value and the size of the corresponding one of the plurality of CBG sets are transmitted in a same DCI of the plurality of DCIs. In one example, the size of the corresponding one of the plurality of CBG sets corresponds to a number of CBGs in the corresponding one of the plurality of CBG sets. In one example, the plurality of cumulative indices are a plurality of counter DAIs, and the total index is a total DAI.

In one example, the UE receives the plurality of DCIs on the plurality of CCs according to a blind decoding (BD). In one example, the UE receives a plurality of at least one TB according to the plurality of DCIs, respectively, and decodes the plurality of CBG sets in the plurality of at least one TB, respectively.

In one example, the step of generating the plurality of HARQ feedback messages according to the plurality of CBG sets, the plurality of cumulative indices, the total index and the plurality of decoding results further comprises generating a HARQ feedback message of the plurality of HARQ feedback messages according to (e.g., by concatenating) a decoding result of the plurality of decoding results if a value determined according to the plurality of cumulative indices is identical to a number of a CBG set of the plurality of CBG sets received by the communication, and generating the HARQ feedback message according to (e.g., by concatenating) the decoding result and at least one NACK if the value is not identical to the number. In one example, a number of the at least one NACK is equal to the value minus the number.

For example, the UE receives two CBGs and a first DCI including a first size "2", a first cumulative index "2" and a total index "10" on a first CC. That is, the UE does not miss any CBG on the first CC. The UE receives a first TB according to the first DCI, and decodes the two CBGs in the first TB. The UE generates a first HARQ feedback message of 2 bits according to the decoding result of the two CBGs. For example, the UE receives two CBGs and a first DCI including a first size "6", a first cumulative index "6" and a total index "10" on a first CC. That is, the UE misses four CBGs on the first CC. The UE receives a first TB according to the first DCI, and decodes the two CBGs in the first TB. The UE generates a first HARQ feedback message of 6 bits. The previous 2 bits in the first HARQ feedback message are determined according to the decoding result of the two CBGs, and remaining 4 bits in the first HARQ feedback message are NACKs because the UE misses the four CBGs on the first CC.

For example, the UE receives two CBGs and a second DCI including a second size "2", a second cumulative index "4" and a total index "10" on a second CC. The UE receives a first cumulative index "2" on a first CC. That is, the UE does not miss any CBG on the first CC and the second CC. The UE receives a second TB according to the second DCI, and decodes the two CBGs in the second TB. Then, the UE generates a second HARQ feedback message of 2 bits according to the decoding result of the 2 CBGs. For example, the UE receives two CBGs and a second DCI including a second size "2", a second cumulative index "6" and a total index "10" on a second CC. The UE receives a first cumulative index "2" on a first CC. That is, the UE misses two CBGs on the second CC. The UE receives a second TB according to the second DCI, and decodes the two received CBGs in the second TB. Then, the UE generates a second HARQ feedback message of 4 bits. The previous 2 bits in the second HARQ feedback message are determined according to the decoding result of the two received CBGs, and remaining 2 bits in the second HARQ feedback message are NACKs because the UE misses the two CBGs on the second CC.

In one example, the UE stops receiving any DCI on the plurality of CCs (e.g., according to the BD), if a value indicated by the total index is identical to a number of the plurality of CBG sets received by the communication device on the plurality of CCs. Otherwise, the UE keeps receiving the plurality of DCIs on the plurality of CCs (e.g; according to the BD).

In one example, the step of generating the plurality of HARQ feedback messages according to the plurality of sizes, the plurality of cumulative indices, the total index and the plurality of decoding results further comprises generating a last HARQ feedback message including at least one NACK, if the UE does not receive any DCI in remaining CCs of the plurality of CCs or if a value indicated by the total index is not identical to the number of the plurality of CBG sets received by the communication device on the plurality of CCs. In one example, a number of the at least one NACK is determined according to the total index and a largest value indicated by the plurality of cumulative indices.

For example, the UE receives a third DCI including a third size "6", a third cumulative index "10" and a total index "10" on a third CC. Thus, the UE stops receiving DCIs, and generates a third HARQ feedback message of 6 bits. For example, the UE receives a third DCI including a third size "2", a third cumulative index "6" and a total index "10" on a third CC, and does not receive any CBG on a fourth CC. That is, the UE misses four CBGs transmitted on the fourth CC. Thus, the UE generates a third HARQ feedback message of 6 bits and a last HARQ feedback message of 4 bits. The 4 bits in last HARQ feedback message are NACKs, because the UE missed the four CBGs on the fourth CC.

The following examples may be applied to the processes 30-40.

In one example, the network encodes the plurality of cumulative indices in the plurality of DCIs to reduce signaling overhead. For example, the network may use cumulative indices of 2 bits according to a wrapped around function, to represent numbers of CBGs in the plurality of CBG sets. If the numbers are 2, 4 and 8 in three DCIs, respectively, the cumulative indices may be 01, 11 and 11, respectively. Similar encoding techniques can be applied to the total index to reduce signaling overhead, and are not narrated herein. In one example, a lookup table indicating relations between code points and numbers of CBGs is predetermined, and is known to both the network and the UE. In one example, the plurality of cumulative indices and the total index are referred to a plurality of counter DAIs and a total DAI, respectively.

In one example, the network sets a cumulative index in a DCI such that a number of CBGs transmitted in the corresponding DL data is not counted by the UE. For example, the network transmits 2 CBGs, 1 CBG and 1 CBG in a first DL data, a second DL data, and a third DL data, respectively. The network sets cumulative indices in a first DCI, a second DCI, and a third DCI as "0", "2" and "3", respectively. The UE knows numbers of CBGs transmitted in the three DL data and generates HARQ feedback messages, according to the cumulative indices.

In one example, the UE may combine (e.g., concatenate) all HARQ feedback messages into a single HARQ feedback message. In one example, the format of the plurality of HARQ feedback messages is predetermined, and is known to both the network and the UE.

In one example, the UE transmits a plurality of HARQ feedback messages corresponding to a plurality of TBs, respectively, on a same TTI and a same CC to the network. Then, the network may receive at least one NACK in the plurality of HARQ feedback messages on the same TTI and the same CC, and may retransmit a plurality of CBGs in response to the at least one NACK.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a CBG-based transmission. A network transmits DCIS including a plurality of indices corresponding to a plurality of CBGs in a plurality of CBG sets to a UE. The UE generates correct HARQ feedback messages according to the DCIS, and the CBG-based transmission between the UE and the network can be performed regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for handling a code block group (CBG)-based transmission, comprising:
a storage device; and
a processing circuit, coupled to the storage device, wherein the storage device stores, and the processing circuit is configured to execute instructions of:
configuring a CBG-based transmission to a communication device;
generating a plurality of CBG sets;
generating a plurality of cumulative indices for the plurality of CBG sets, respectively, and generating a total index for the plurality of CBG sets;
generating a plurality of downlink control informations (DCIs), wherein each of the plurality of DCIs comprises information indicating a size of a corresponding one of the plurality of CBG sets, a corresponding one of the plurality of cumulative indices and the total index; and
transmitting the plurality of DCIs and the plurality of CBG sets to the communication device via the CBG-based transmission;
wherein each of the plurality of CBG sets comprises at least two CBGs; and
wherein the plurality of cumulative indices indicate numbers of CBGs which have been transmitted by the network.

2. The network of claim 1, wherein the network configures the CBG-based transmission to the communication device by transmitting a radio resource control (RRC) message comprising a configuration configuring the CBG-based transmission to the communication device.

3. The network of claim 1, wherein a difference between two adjacent cumulative indices of the plurality of cumulative indices is determined according to the size of the corresponding one of the plurality of CBG sets.

4. The network of claim 1, wherein the size of the corresponding one of the plurality of CBG sets corresponds to a number of CBGs in the corresponding one of the plurality of CBG sets.

5. The network of claim 1, wherein the plurality of cumulative indices are a plurality of counter downlink (DL) assignment indices (DAIs), and the total index is a total DAI.

6. The network of claim 1, wherein the instructions further comprise:
transmitting at least one RRC message comprising at least one configuration configuring a plurality of component carriers (CCs) to the communication device.

7. The network of claim 6, wherein the network transmits the plurality of DCIs and the plurality of CBG sets to the communication device via the CBG-based transmission on the plurality of CCs, respectively.

8. The network of claim 6, wherein at least one DCI of the plurality of DCIs and at least one CBG set of the plurality of CBG sets is not transmitted on at least one same CC according to a cross-carrier scheduling (CCS).

9. The network of claim 6, wherein the network transmits the plurality of DCIs and the plurality of CBG sets to the communication device via the CBG-based transmission on one of the plurality of CCs according to a multi-input multi-output (MIMO) scheme.

10. The network of claim 9, wherein the MIMO scheme is a spatial multiplexing (SM) scheme.

11. The network of claim 6, wherein the network transmits the plurality of DCIs and the plurality of CBG sets to the communication device via the CBG-based transmission on one of the plurality of CCs in a plurality of transmission time intervals (TTIs), respectively.

12. A communication device for handling a code block group (CBG)-based transmission, comprising:
a storage device; and
a processing circuit, coupled to the storage device, wherein the storage device stores, and the processing circuit is configured to execute instructions of:
receiving a first configuration configuring a plurality of component carriers (CCs) from a network;
receiving a second configuration configuring a CBG-based transmission from the network;
receiving a plurality of downlink control informations (DCIs) and a plurality of CBG sets from the network via the CBG-based transmission on the plurality of CCs, respectively, wherein each of the plurality of DCIs comprise information indicating a size of a corresponding one of the plurality of CBG sets, a corresponding one of a plurality of cumulative indices for the plurality of CBG sets and a total index for the plurality of CBG sets;
decoding the plurality of CBG sets according to the plurality of DCIs, to generate a plurality of decoding results, respectively;
generating a plurality of Hybrid Automatic Repeat Request (HARQ) feedback messages according to the plurality of CBG sets, the plurality of cumulative indices, the total index and the plurality of decoding results; and
transmitting the plurality of HARQ feedback message to the network on at least one of the plurality of CCs;
wherein each of the plurality of CBG sets comprises at least two CBGs; and
wherein the plurality of cumulative indices indicate numbers of CBGs which have been transmitted by the network.

13. The communication device of claim 12, wherein a difference between two adjacent cumulative indices of the plurality of cumulative indices is determined according to the size of the corresponding one of the plurality of CBG sets.

14. The communication device of claim 12, wherein the size of the corresponding one of the plurality of CBG sets corresponds to a number of CBGs in the corresponding one of the plurality of CBG sets.

15. The communication device of claim 12, wherein the plurality of cumulative indices are a plurality of counter downlink (DL) assignment indices (DAIs), and the total index is a total DAI.

16. The communication device of claim 12, wherein the communication device receives a plurality of at least one transport block (TB) according to the plurality of DCIs, respectively, and decodes the plurality of CBG sets in the plurality of at least one TB, respectively.

17. The communication device of claim 12, wherein the instruction of generating the plurality of HARQ feedback messages according to the plurality of CBG sets, the plurality of cumulative indices, the total index and the plurality of decoding results further comprises:
generating a HARQ feedback message of the plurality of HARQ feedback messages according to a decoding result of the plurality of decoding results, if a value determined according to the plurality of cumulative indices is identical to a number of a CBG set of the plurality of CBG sets received by the communication device; and
generating the HARQ feedback message according to the decoding result and at least one negative acknowledgement (NACK), if the value is not identical to the number;
wherein a number of the at least one NACK is equal to the value minus the number.

18. The communication device of claim 12, wherein the instructions further comprise:
stopping receiving any DCI on the plurality of CCs, if a value indicated by the total index is identical to a number of the plurality of CBG sets received by the communication device on the plurality of CCs.

19. The communication device of claim 12, wherein the instruction of generating the plurality of HARQ feedback messages according to the plurality of CBG sets, the plurality of cumulative indices, the total index and the plurality of decoding results further comprises:
generating a last HARQ feedback message comprising at least one NACK, if a value indicated by the total index is not identical to a number of the plurality of CBG sets received by the communication device on the plurality of CCs;
wherein a number of the at least one NACK is determined according to the total index and a largest value indicated by the plurality of cumulative indices.

\* \* \* \* \*